United States Patent
Ahmed

(10) Patent No.: US 8,131,399 B2
(45) Date of Patent: Mar. 6, 2012

(54) BUILDING CONTROL SYSTEM WITH BUILDING LEVEL NETWORK AND ROOM NETWORK USING DIFFERENT WIRELESS COMMUNICATION SCHEMES

(75) Inventor: Osman Ahmed, Hawthorn Woods, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1629 days.

(21) Appl. No.: 10/353,142

(22) Filed: Jan. 28, 2003

(65) Prior Publication Data
US 2004/0008651 A1 Jan. 15, 2004

Related U.S. Application Data

(60) Provisional application No. 60/352,452, filed on Jan. 28, 2002.

(51) Int. Cl.
*G05D 23/00* (2006.01)
(52) U.S. Cl. .................... 700/277; 700/276
(58) Field of Classification Search .......... 700/276, 700/277
See application file for complete search history.

(56) References Cited

U.S. PATENT DOCUMENTS

| | | | |
|---|---|---|---|
| 5,297,252 A | 3/1994 | Becker | 395/160 |
| 5,361,198 A | 11/1994 | Harmon et al. | 364/188 |
| 5,385,297 A * | 1/1995 | Rein et al. | 236/49.3 |
| 5,562,537 A | 10/1996 | Zver et al. | |
| 5,631,825 A | 5/1997 | Van Weele et al. | 364/188 |
| 5,737,318 A | 4/1998 | Melnik | |
| 6,137,403 A | 10/2000 | Desrochers et al. | 340/540 |
| 6,169,927 B1 | 1/2001 | Schonthal | 700/1 |
| 6,199,575 B1 | 3/2001 | Widner | 137/227 |
| 6,232,968 B1 | 5/2001 | Alimpich et al. | 345/333 |
| 6,625,500 B1 | 9/2003 | Li | |
| 7,860,495 B2 * | 12/2010 | McFarland | 455/420 |
| 2001/0025349 A1 | 9/2001 | Sharood et al. | 713/340 |
| 2001/0040509 A1 | 11/2001 | Dungan | |
| 2002/0022894 A1 | 2/2002 | Eryurek et al. | 700/80 |
| 2002/0022991 A1 * | 2/2002 | Sharood et al. | 705/14 |
| 2003/0151513 A1 * | 8/2003 | Herrmann et al. | 340/573.1 |
| 2004/0008651 A1 | 1/2004 | Ahmed | |
| 2004/0019392 A1 | 1/2004 | Hirai | |
| 2004/0088082 A1 | 5/2004 | Ahmed | |

(Continued)

FOREIGN PATENT DOCUMENTS

EP 0068289 1/1983

(Continued)

OTHER PUBLICATIONS

PCT International Search Report.

*Primary Examiner* — Ryan Jarrett

(57) ABSTRACT

A controller arrangement for a building system includes a sensor module, an actuator module, and a controller. The sensor module comprises a wireless communication device and a microelectromechanical sensor device operable to generate a process value and a wireless communication device. The actuator module comprises an actuation element and a wireless communication device. The controller is operable to obtain the process value from the sensor module and provide a control output to the actuator module, the controller further operable to communicate with at least one of the sensor module and the actuator module using a wireless communication device. The controller is also connected to receive a set point value, and is operable to generate the control output based on the process value and the set point value.

13 Claims, 9 Drawing Sheets

U.S. PATENT DOCUMENTS

| | | | |
|---|---|---|---|
| 2004/0194484 A1* | 10/2004 | Zou et al. | 62/186 |
| 2006/0097063 A1* | 5/2006 | Zeevi | 236/49.3 |
| 2010/0148919 A1* | 6/2010 | Roberts et al. | 340/5.2 |

FOREIGN PATENT DOCUMENTS

| | | |
|---|---|---|
| EP | 0 940 787 A2 | 9/1999 |
| EP | 1696371 | 8/2006 |
| WO | WO 9708914 A1 * | 3/1997 |
| WO | WO 99/57697 | 11/1999 |
| WO | WO 00/54237 | 9/2000 |
| WO | WO 01/26330 A2 | 4/2001 |
| WO | WO 01/35190 A2 | 5/2001 |
| WO | WO 01/93220 A1 | 12/2001 |
| WO | WO 02/31607 A2 | 4/2002 |
| WO | WO 2004/038525 | 5/2004 |

* cited by examiner

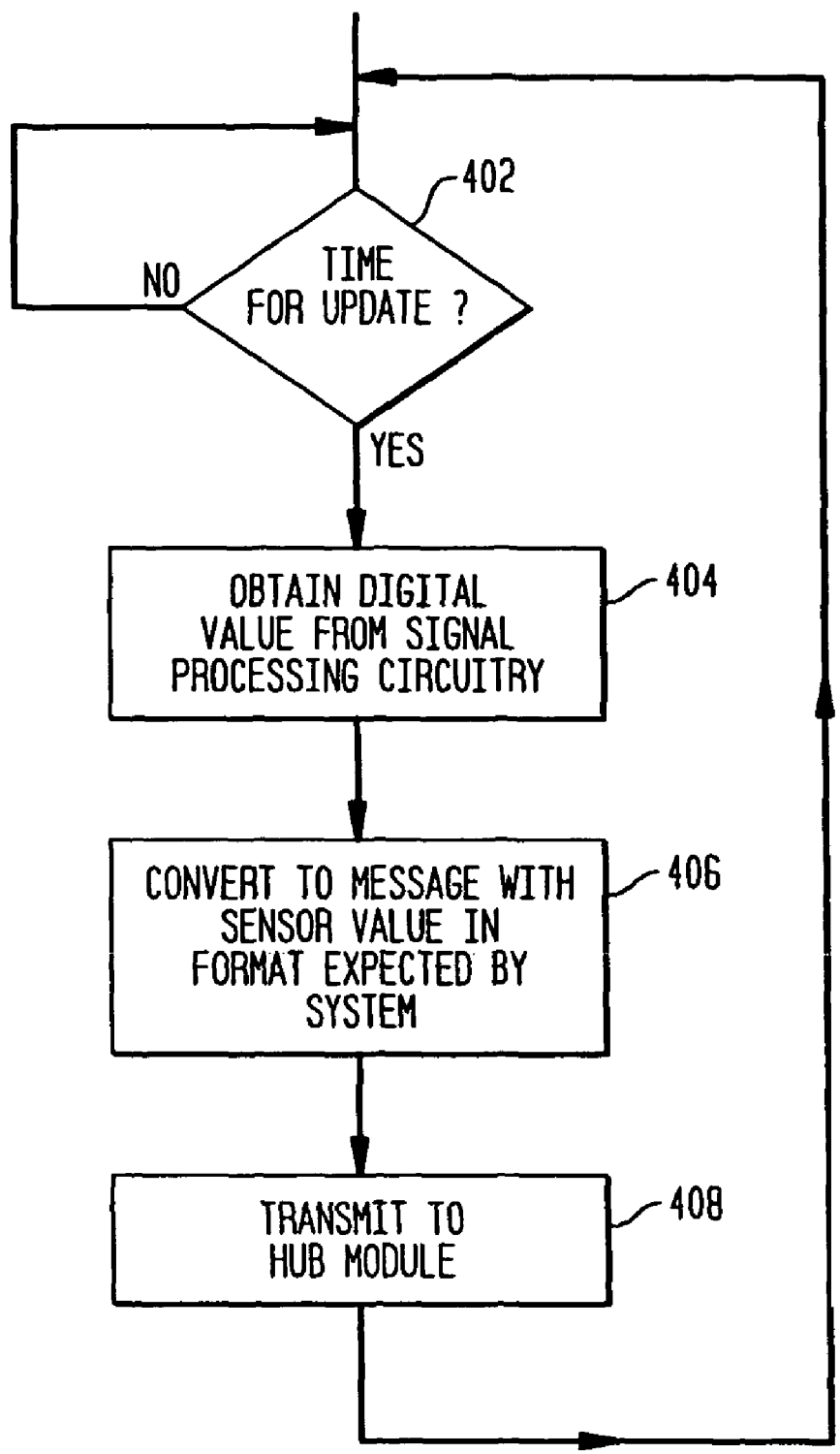

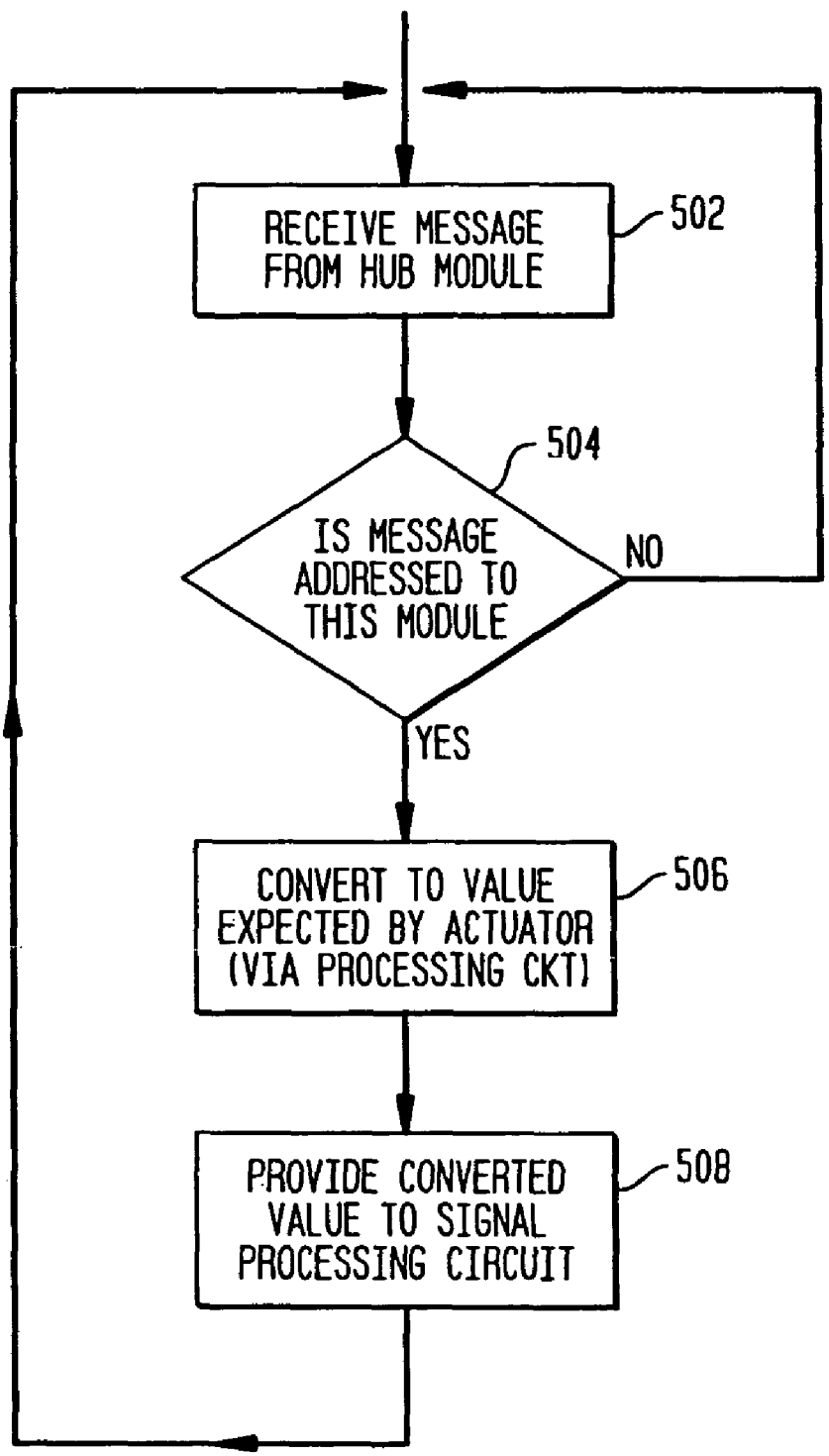

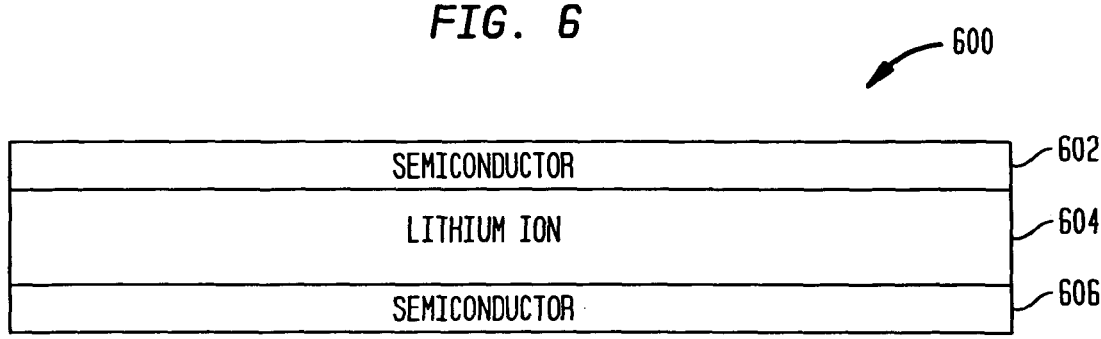
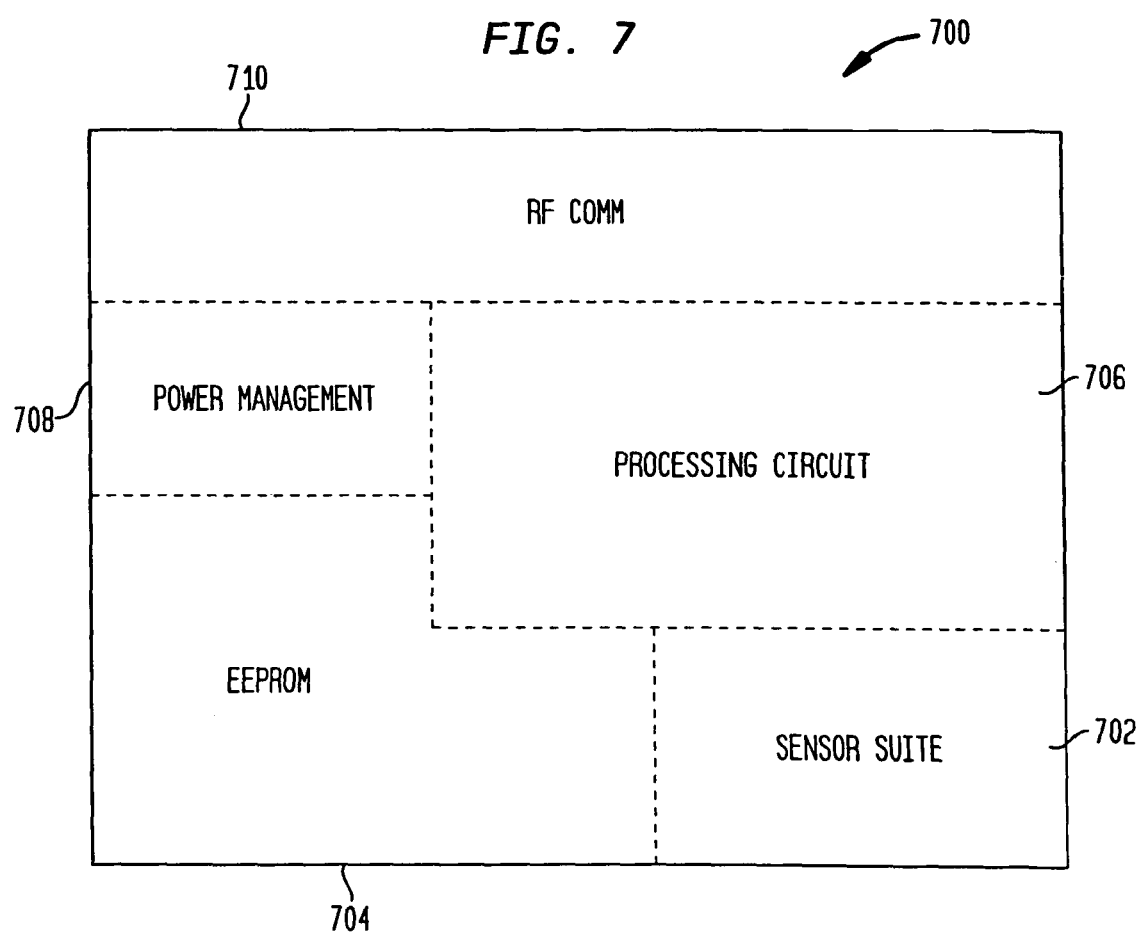

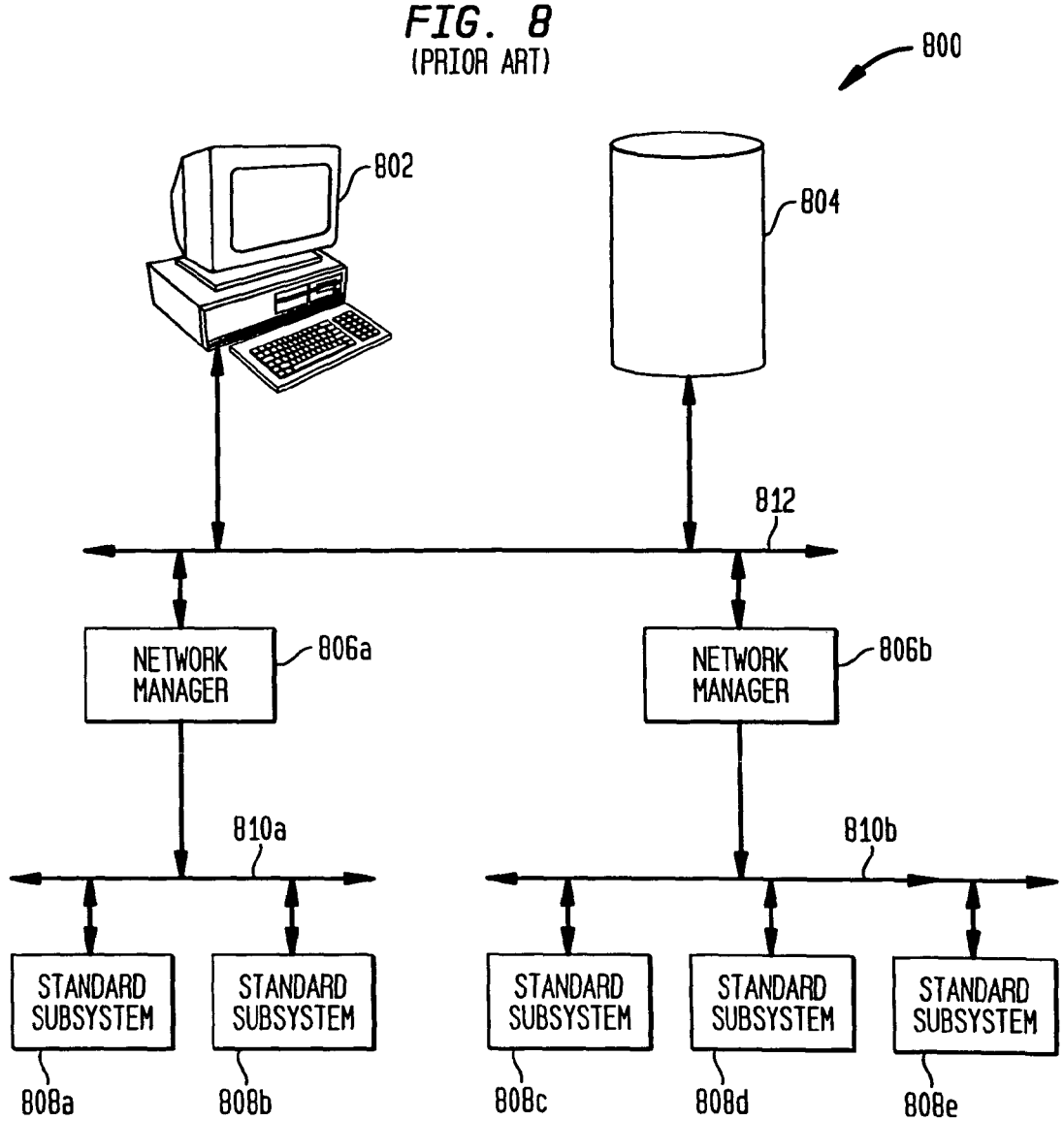

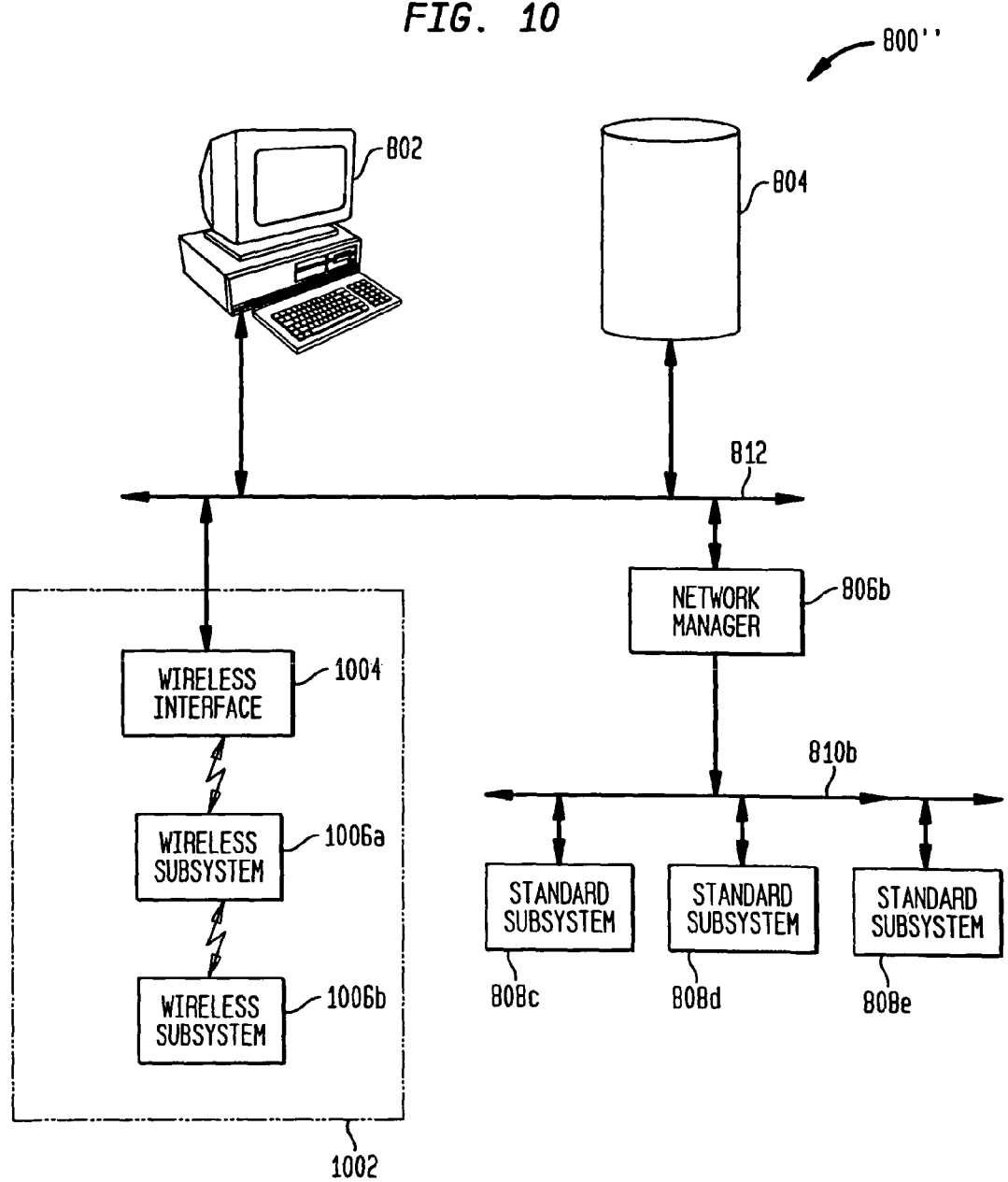

BUILDING CONTROL SYSTEM WITH BUILDING LEVEL NETWORK AND ROOM NETWORK USING DIFFERENT WIRELESS COMMUNICATION SCHEMES

This application claims the benefit of U.S. Provisional Patent Application Ser. No. 60/352,452, filed Jan. 28, 2002, and which is incorporated herein by reference.

CROSS REFERENCE TO RELATED APPLICATIONS

Cross reference is made to co-pending application entitled "Building Control System and Fume Hood System for Use Therein Having Reduced Wiring Requirements", Ser. No. 10/353,110, filed on even date herewith, and which is incorporated herein by reference.

FIELD OF THE INVENTION

The present invention relates generally to building control systems, such of the type that control heating, ventilation, air conditioning, fire safety, lighting, security and other systems of a building or facility.

BACKGROUND OF THE INVENTION

Building control systems are employed to regulate and control various environmental and safety aspects of commercial, industrial and residential facilities (hereinafter referred to as "buildings"). In ordinary single-family residences, control systems tend to be simple and largely unintegrated. However, in large buildings, building control systems often consist of multiple, integrated subsystems employing hundreds of elements.

For example, a heating, ventilation and air-conditioning ("HVAC") building control system interrelates small, local control loops with larger control loops to coordinate the delivery of heat, vented air, and chilled air to various locations throughout a large building. Local control systems may use local room temperature readings to open or close vents that supply heated or chilled air. Larger control loops may obtain many temperature readings and/or air flow readings to control the speed of a ventilation fan, or control the operation of heating or chilling equipment.

As a consequence of the interrelationship of these control loops, many elements of a building control system must communicate information to each other. To this end, communication networks have been incorporated that transmit digital data between and among the various elements in accordance with one or more sets of protocols. By way of example, one or more local area networks using Ethernet or other standard protocols are often used to effect communication between elements and subsystems.

A drawback to the current state of HVAC systems is the amount of wiring involved in connecting all of the elements of the system in a large building. A large building may have hundreds of sensors, room controllers, and actuation devices. All of these elements must be interconnected in some manner so that both local and overall control operations may be carried out. Installation of the large number of wires required to accomplish such interconnection is labor intensive, and requires significant material cost.

As a consequence, there is a need for a building control system that reduces the wiring requirements of the current systems.

SUMMARY OF THE INVENTION

The present addresses the above needs, as well as others, by providing a building control system that incorporates wireless communications and/or microelectromechanical ("MEMS") technology. By incorporating wireless communications, at least some of the wiring employed for data communication may be eliminated. Preferably, such a system employs MEMS sensor elements that may be incorporated into sensor modules that include both the sensor element and a local RF communication circuit. By employing MEMS sensor elements and local RF communication circuits, power requirements are reduced, and sensors may be implemented with stand-alone power sources, for example, batteries. Battery powered sensor modules may be implemented completely without wiring.

A first embodiment of the invention is a controller arrangement for a building system that includes a sensor module, an actuator module, and a controller. The sensor module comprises a wireless communication device and a microelectromechanical sensor device operable to generate a process value and a wireless communication device. The actuator module comprises an actuation element and a wireless communication device. The controller is operable to obtain the process value from the sensor module and provide a control output to the actuator module, the controller further operable to communicate with at least one of the sensor module and the actuator module using a wireless communication device. The controller is also connected to receive a set point value, and is operable to generate the control output based on the process value and the set point value.

Another embodiment of the invention is a building control system that includes a plurality of controller arrangements. Each controller arrangement includes a controller, at least one sensor module, and a wireless communication interface. Each controller is operable to generate a control output value based on at least one process value and at least one set point value. The sensor module is operable to generate the at least one process value and is operably connected to the controller. The wireless communication interface is also operably coupled to the controller, and is configured to communicate information with a remote element of the building control system using a first wireless communication scheme.

The above described features and advantages, as well as others, will become more readily apparent to those of ordinary skill in the art by reference to the following detailed description and accompanying drawings.

BRIEF DESCRIPTION OF THE DRAWINGS

FIG. 4 shows a flow diagram of an exemplary set of operations of a sensor module controller of the space control subsystem of FIG. 2;

FIG. 5 shows a flow diagram of an exemplary set of operations of an actuator module controller of the space control subsystem of FIG. 2;

FIG. 6 shows a side view of an exemplary wireless module according to the present invention;

FIG. 7 shows a diagrammatic block diagram of a module circuit of the wireless module of FIG. 6;

FIG. 8 shows a block diagram of a prior art building automation system;

FIG. 10 shows a block diagram of the building system of FIG. 8 with several retrofitted elements in accordance with the invention.

DETAILED DESCRIPTION

Figure 1:
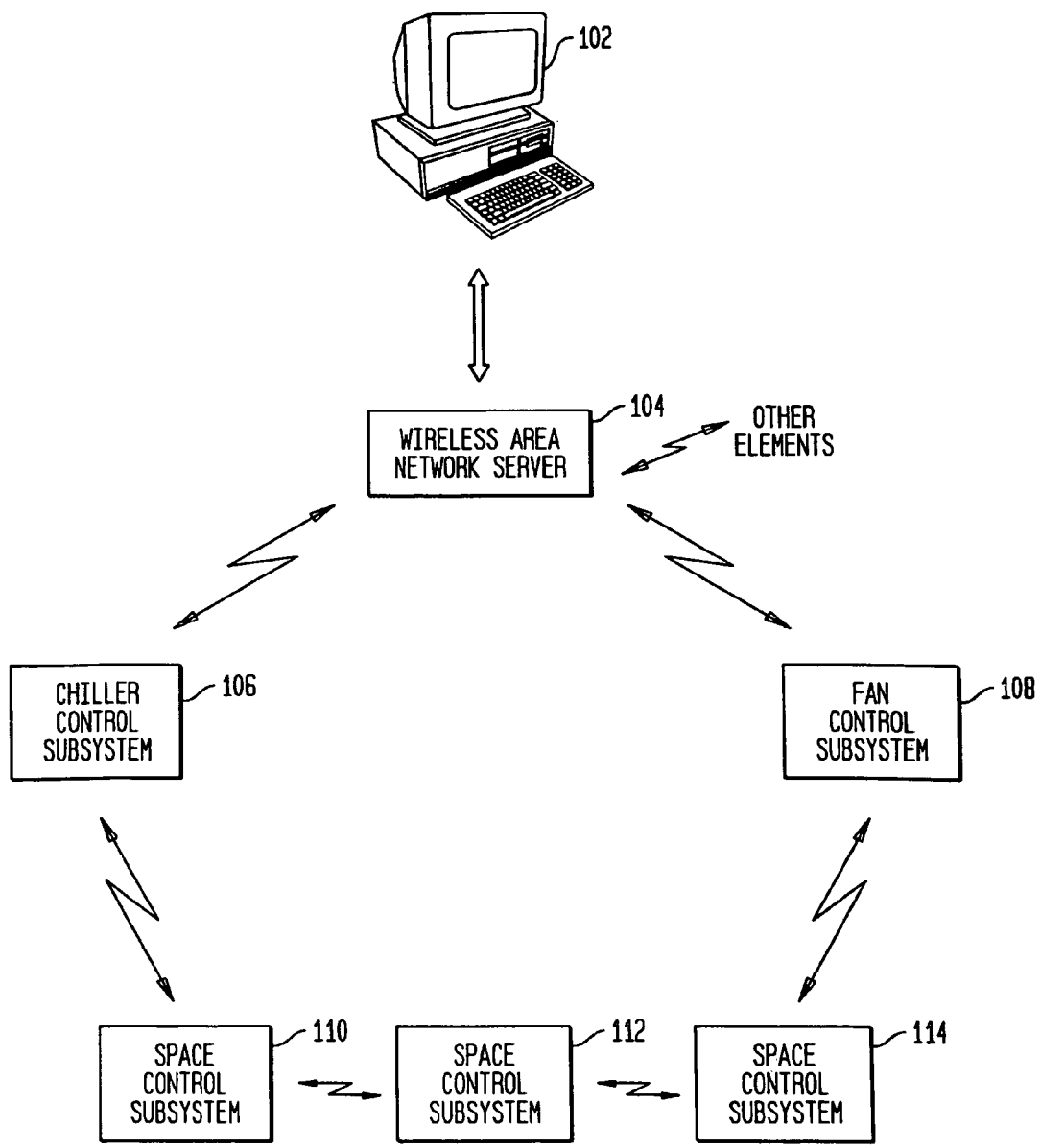
FIG. 1 shows a block diagram of an exemplary building control system in accordance with the present invention.

FIG. 1 shows a block diagram of an exemplary building control system in accordance with the present invention. The building control system 100 includes a supervisory computer 102, a wireless area network server 104, a chiller controller subsystem 106, a fan controller subsystem 108, and room controller subsystems 110, 112 and 114. The building control system 100 includes only the few above-mentioned elements for clarity of exposition of the principles of the invention. Typical building control systems will include many more space control subsystems, as well as many more chiller, fan, heater, and other building HVAC subsystems. Those of ordinary skill in the art may readily incorporate the methods and features of the invention described herein into building control systems of larger scale.

In general, the building control system 100 employs a first wireless communication scheme to effect communications between the supervisory computer 102, the chiller controller subsystem 106, the fan controller subsystem 108, and the room controller subsystems 110, 112 and 114. A wireless communication scheme identifies the specific protocols and RF frequency plan employed in wireless communications between sets of wireless devices. In the embodiment described herein, the first wireless communication scheme is implemented as a wireless area network. To this end, a wireless area network server 104 coupled to the supervisory computer 102 employs a packet-hopping wireless protocol to effect communication by and among the various subsystems of the building control system 100. U.S. Pat. No. 5,737,318, which is incorporated herein by reference, describes a wireless packet hopping network that is suitable for HVAC/building control systems of substantial size.

In general, the chiller controller subsystem 106 is a subsystem that is operable to control the operation of a chiller plant, not shown, within the building. Chiller plants, as is known in art, are systems that are capable of chilling air that may then be ventilated throughout all or part of the building to enable air conditioning. Various operations of chiller plants depend upon a number of input values, as is known in the art. Some of the input values may be generated within the chiller controller subsystem 106, and other input values are externally generated. For example, operation of the chiller plant may be adjusted based on various air flow and/or temperature values generated throughout the building. The operation of the chiller plant may also be affected by set point values generated by the supervisory computer 102. The externally-generated values are communicated to the chiller controller subsystem 106 using the wireless area network.

The fan controller subsystem 108 is a subsystem that is operable to control the operation of a ventilation fan, not shown, within the building. A ventilation fan, as is known in art, is a prime mover of air flow throughout the ventilation system of the building. This primary air flow power may be used to refresh the air within the facility, and may be used to distribute chilled air from the chiller plant. As with the chiller plant, ventilation fans and their implementation within building control systems are well known in the art. Also, the fan controller subsystem 108 is similarly configured to receive input values from other subsystems (or the supervisory computer 102) over the wireless area network.

The room controllers 110, 112 and 114 are local controller subsystems that operate to control an environmental aspect of a location or "space" within the building. While such locations may be referred to herein as "rooms" for convenience, it will be appreciated that such locations may further be defined zones within larger open or semi-open spaces of a building. The environmental aspect(s) that are controllable by the space control subsystems 110, 112 and 114 typically include temperature, and may include air quality, lighting and other building system processes.

Figure 2:
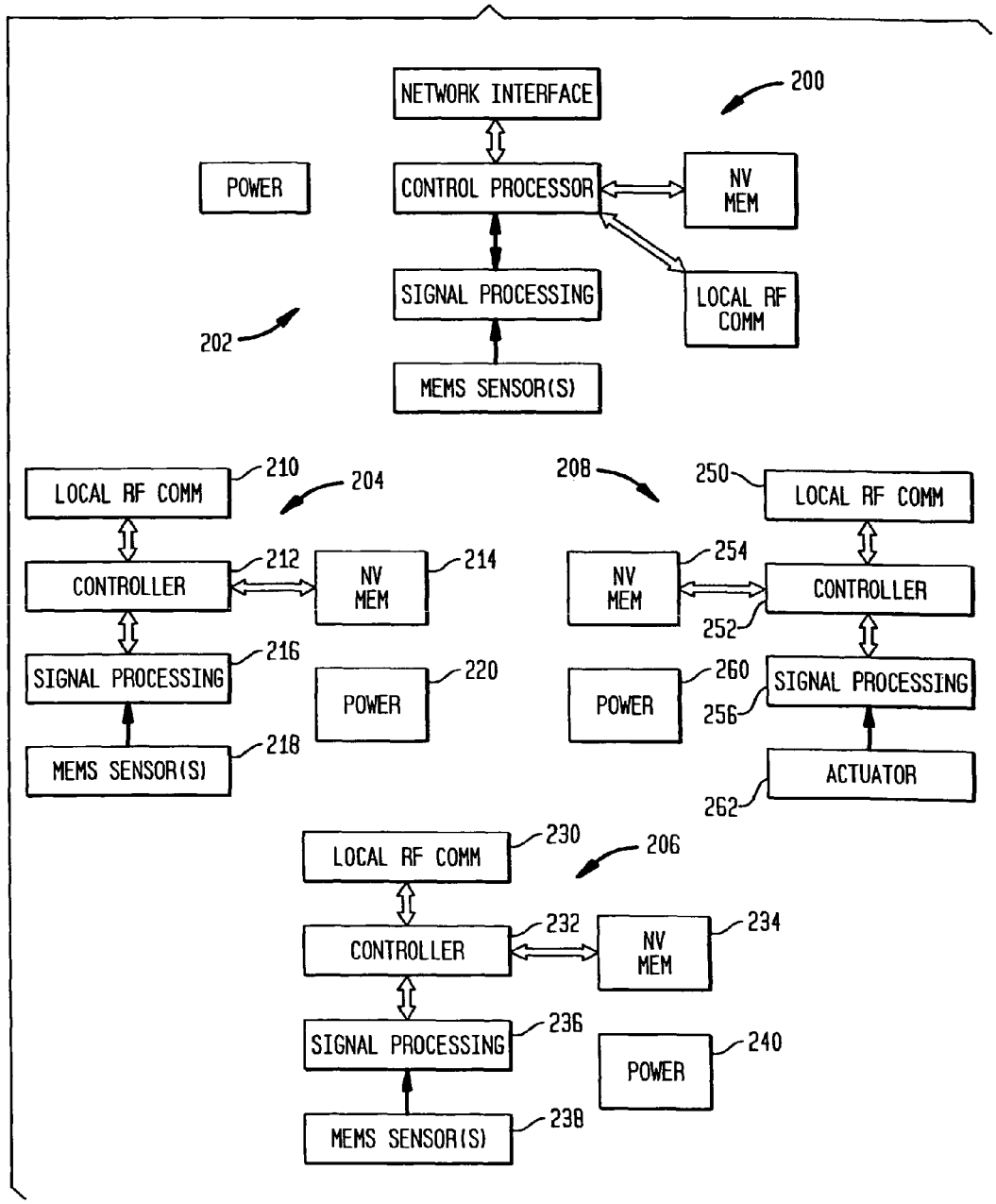
FIG. 2 shows a block diagram of an exemplary space control subsystem of the building control system of FIG. 1.

In accordance with one aspect of the present invention, each of the space control subsystems 110, 112 and 114 has multiple elements that communicate with each other using a second wireless communication scheme. In general, it is preferable that the second communication scheme employ a short-range or local RF communication scheme such as Bluetooth. FIG. 2, discussed further below, shows a schematic block diagram of an exemplary room control system that may be used as the space control subsystems 110.

Referring to FIG. 2, the space control subsystem 110 includes a hub module 202, first and second sensor modules 204 and 206, respectively, and an actuator module 208. It will be appreciated that a particular room controller subsystem 200 may contain more or less sensor modules or actuator modules. In the exemplary embodiment described herein, the space control subsystem 110 is operable to assist in regulating the temperature within a room or space pursuant to a set point value. The space control subsystem 110 is further operable to obtain data regarding the general environment of the room for use, display or recording by a remote device, not shown in FIG. 2, of the building control system. (E.g., supervisory computer 102 of FIG. 1).

The first sensor module 204 represents a temperature sensor module and is preferably embodied as a wireless integrated network sensor that incorporates microelectromechanical system technology ("MEMS"). By way of example, in the exemplary embodiment described herein, the first sensor module 204 includes a MEMS local RF communication circuit 210, a microcontroller 212, a programmable non-volatile memory 214, a signal processing circuit 216, and one or more MEMS sensor devices 218. The first sensor module 204 also contains a power supply/source 220. In the preferred embodiment described herein, the power supply/source 220 is a battery, for example, a lithium ion battery.

Examples of MEMS circuits suitable for implementing the first sensor module 204 are described in the ESSCIRC98 Presentation "Wireless Integrated Network Sensors (WINS)", which is published on-line at www.janet.ucla.edu/WINS/archives, (hereinafter referred to as the "WINS Presentation"), and which is incorporated herein by reference. FIG. 6, discussed further below, describes a single substrate or single device solution for the sensor module 204.

The MEMS sensor device(s) 218 include at least one MEMS sensor, which may suitably be a temperature sensor, flow sensor, pressure sensor and/or gas-specific sensor. In a preferred embodiment, several sensors are incorporated into a single device as a sensor suite 218. Upon installation, the sensor module 204 may be programmed to enable the particular sensing capability, for example, temperature sensing.

By incorporating different, selectable sensor capabilities, a single sensor module design may be manufactured for use in a large majority of HVAC or other building automation and/or safety sensing applications. As discussed below in connection with FIG. 6, a set of selectable sensor devices may further include, by way of example, a light sensor, a heat or smoke sensor, a movement sensor, and/or a biometric sensor. MEMS devices capable of providing such sensor functionality have been developed and are known in the art. In accordance with one aspect of the invention, several known MEMS sensing technologies are incorporated into a single substrate. As a consequence, a manner, a single sensor module design may be used in a large number of building automation and/or safety applications.

In the embodiment of FIG. 2, the sensor module 204 is configured to enable its temperature sensing function.

The signal processing circuit 216 includes the circuitry that interfaces with the sensor, converts analog sensor signals to digital signals, and provides the digital signals to the microcontroller 212. Examples of low power, micro-electronic A/D converters and sensor interface circuitry are shown in the WINS Presentation.

The programmable non-volatile memory 214, which may be embodied as a flash programmable EEPROM, stores configuration information for the sensor module 204. By way of example, programmable non-volatile memory 214 preferably includes system identification information, which is used to associate the information generated by the sensor module 204 with its physical and/or logical location in the building control system. For example, the programmable non-volatile memory 214 may contain an "address" or "ID" of the sensor module 204 that is appended to any communications generated by the sensor module 110.

The memory 214 further includes set-up configuration information related to the type of sensor being used. For example, if the sensor device(s) 218 are implemented as a suite of sensor devices, the memory 214 includes the information that identifies which sensor functionality to enable. (See FIGS. 3 and 4, discussed further below). The memory 214 may further include calibration information regarding the sensor, and system RF communication parameters (i.e. the second RF communication scheme) employed by the microcontroller 212 and/or RF communication circuit 210 to transmit information to other devices.

The microcontroller 212 is a processing circuit operable to control the general operation of the sensor module 204. In general, however, the microcontroller 212 receives digital sensor information from the signal processing circuit 216 and provides the information to the local RF communication circuit 210 for transmission to a local device, for example, the hub module 202. The microcontroller 212 may cause the transmission of sensor data from time-to-time as dictated by an internal counter or clock, or in response to a request received from the hub module 202.

The microcontroller 212 is further operable to receive configuration information via the RF communication circuit 210, store configuration information in the memory 214, and perform operations in accordance with such configuration information. As discussed above, the configuration information may define which of multiple possible sensor functionalities is to be provided by the sensor module 204. The microcontroller 212 employs such information to cause the appropriate sensor device or devices from the sensor device suite 218 to be operably connected to the signal processing circuit such that sensed signals from the appropriate sensor device are digitized and provided to the microcontroller 212. As discussed above, the microcontroller 212 may also use the configuration information to format outgoing messages and/or control operation of the RF communication circuit 210.

The MEMS local RF communication circuit 210 may suitably include a Bluetooth RF modem, or some other type of short range (about 30-100 feet) RF communication modem. The use of a MEMS-based RF communication circuit allows for reduced power consumption, thereby enabling the potential use of a true wireless, battery operated sensor module 204. A suitable exemplary MEMS-based RF communication circuit is discussed in the WINS Presentation.

As discussed above, it is assumed that the sensor module 204 is configured to operate as a temperature sensor. To this end, the memory 214 stores information identifying that the sensor module 204 is to operate as a temperature sensor. Such information may be programmed into the memory 214 via a wireless programmer. The module 204 may be programmed upon shipment from the factory, or upon installation into the building control system. The microcontroller 212, responsive to the configuration information, causes the signal processing circuit 216 to process signals only from the temperature sensor, ignoring output from other sensors of the sensor suite 218.

It will be appreciated that in other embodiments, the sensor suite 218 may be replaced by a single sensor. However, additional advantages may be realized through the use of a configurable sensor module capable of performing any of a plurality of sensor functions. As discussed further above, these advantages include the reduction of the number of sensor module designs.

In addition, the reduced wiring requirements and the reduced power consumption of the above described design provides benefits even in non-battery operated sensors.

The sensor module 206 is configured to operate as a flow sensor in the embodiment described herein. The sensor module 206 may suitably have the same physical construction as the sensor module 204. To this end, the sensor module 206 includes a local RF communication circuit 230, a microcontroller 232, a programmable non-volatile memory 234, a signal processing circuit 236, a sensor suite 238, and a power supply/source 240. In contrast to the sensor module 204, however, the memory 234 of the sensor module 206 contains configuration information identifying that the sensor module 206 is to function as a flow sensor.

The actuator module 208 is a device that is operable to cause movement or actuation of a physical device that has the ability to change a parameter of the building environment. For example, the actuator module 208 in the embodiment described herein is operable to control the position of a ventilation damper, thereby controlling the flow of heated or chilled air into the room.

The actuator module 208 is also preferably embodied as a wireless integrated network device that incorporates microelectromechanical system ("MEMS") devices. By way of example, in the exemplary embodiment described herein, the actuator module 208 includes a MEMS local RF communication circuit 250, a microcontroller 252, a programmable non-volatile memory 254, and a signal processing circuit 256. The actuator module 208 also contains a power supply/source 260. In the preferred embodiment described herein, the power supply/source 260 is a battery, for example, a coin cell battery. However, it will be appreciated that if AC power is necessary for the actuator device (i.e. the damper actuator), which may be solenoid or value, then AC power is readily available for the power supply/source 260. As a consequence, the use of battery power is not necessarily advantageous.

The actuator 262 itself may suitably be a solenoid, stepper motor, brushless DC motor, or other electrically controllable device that drives a mechanical HVAC element. In the exemplary embodiment described herein, the actuator 262 is a stepper motor for controlling the position of a vent damper.

The MEMS local RF communication circuit 250 may suitably be of similar construction and operation as the MEMS local RF communication circuit 210. Indeed, even if the MEMS local RF communication circuit 250 differs from the RF communication circuit 210, it nevertheless should employ the same communication scheme.

The microcontroller 252 is configured to receive control data messages via the RF communication circuit 250. In the embodiment described herein, the control data messages are generated and transmitted by the hub module 202. The control data messages typically include a control output value intended to control the operation of the actuator 262. Accordingly, the microcontroller 252 is operable to obtain the control output value from a received message and provide the control output value to the signal processing circuit 256. The signal processing circuit 256 is a circuit that is configured to generate an analog control signal from the digital control output value. In other words, the signal processing circuit 256 operates as an analog driver circuit. The signal processing circuit 256 includes an output 258 for providing the analog control signal to the actuator 262.

The non-volatile memory 254 is a memory that contains configuration and/or calibration information related to the implementation of the actuator 262. The memory 254 may suitably contain sufficient information to effect mapping between the control variables used by the hub module 202 and the control signals expected by the actuator 262. For example, the control variables used by the hub module 202 may be digital values representative of a desired damper position charge. The actuator 262, however, may expect an analog voltage that represents an amount to rotate a stepper motor. The memory 254 includes information used to map the digital values to the expected analog voltages.

The hub module 202 in the exemplary embodiment described herein performs the function of the loop controller (e.g. a PID controller) for the space control subsystem 110. The hub module 202 obtains process variable values (i.e. sensor information) from either or both of the sensor modules 204 and 206 and generates control output values. The hub module 202 provides the control output values to the actuator module 208. The hub module 202 also communicates with external elements of the building control system, for example, the supervisory computer, fan or chiller control subsystems, and other room controller subsystems.

In the exemplary embodiment described herein, the hub module 202 further includes sensor functionality. In general, it is often advantageous to combine the hub controller core functionality with a sensor function to reduce the overall number of devices in the system. Thus, some room control subsystems could include hub module 202 with an integrated temperature sensor and one or more actuator modules. Separate sensor modules such as the sensor module 204 would not be necessary.

To accomplish these and other functions, the hub module 202 includes a network interface 270, a room control processor 272, a non-volatile memory 274, a signal processing circuit 276, a MEMS sensor suite 278 and a MEMS local RF communication circuit 280.

The network interface 270 is a communication circuit that effectuates communication to one or more components of the building control system that are not a part of the space control subsystem 110. Referring to FIG. 1, the network interface 270 is the device that allows the space control subsystem 110 to communicate with the supervisory computer 102, the fan controller subsystem 106, the chiller controller subsystem 108 and/or the other room controller subsystems.

Referring again to FIG. 2, to allow for wireless communication between controller subsystems of the building control system 100, the network interface 270 is preferably an RF modem configured to communicate using the wireless area network communication scheme. Preferably, the network interface 270 employs a packet-hopping protocol to reduce the overall transmission power required. In packet-hopping, each message may be transmitted through multiple intermediate network interfaces before it reaches its destination. Referring again to FIG. 1, if the space control subsystem 110 sends a message to the fan control subsystem 106, the network interface of the space control subsystem 110 provides the message to the physically closest subsystem. Thus, in the embodiment shown in FIG. 1, the network interface of the space control subsystem 110 provides the message to the network interface of the space control subsystem 112. The network interface of the space control subsystem 112 reads the destination address of the message and determines that the message is not intended to be received at the space control subsystem 112. As a consequence, the network interface of the space control subsystem 112 passes the message along to the network interface of the next closes subsystem, which is the space control subsystem 114. The network interface of the space control subsystem 114 similarly passes the message onto the fan control subsystem 116. The network interface of the fan control subsystem 116, however, recognizes from the destination address in the message that it is the intended recipient. The network interface of the fan control subsystem 116 thus receives the message and processes it.

Referring again to FIG. 2, in order to facilitate the wireless area network operation described above, the network interface 270 is preferably operable to communicate using a short range wireless protocol. The network interface 270 is further operable to, either alone or in conjunction with the control processor 272, interpret messages in wireless communications received from external devices and determine whether the messages should be retransmitted to another external device, or processed internally to the hub module 202. As discussed above, if a packet-hopping protocol is employed, the network interface 270 may receive a message intended for another subsystem. In such a case, the network interface 270 retransmits the message to another device. However, if the network interface 270 includes a temperature set point for the space control subsystem 110 of FIG. 2, then the network interface 270 passes the information to the room control processor 272.

As discussed above, the hub module 202 may optionally include sensor capability. To this end, the MEMS sensor suite 278 may suitably include a plurality of MEMS sensors, for example, a temperature sensor, flow sensor, pressure sensor, and/or gas-specific sensor. As with the sensor modules 204 and 206, the hub module 202 may be programmed to enable the particular desired sensing capability. In this manner, a single hub module design may be manufactured to for use in a variety of HVAC sensing applications, each hub module 202 thereafter being configured to its particular use. (See e.g. FIGS. 3 and 4). However, it may be sufficient to provide hub control modules having only temperature sensing capability because rooms that employ an HVAC controller also typically require a temperature sensor. Thus, a temperature sensor on the hub module will nearly always fill a sensing need when the hub module is employed.

The signal processing circuit 276 includes the circuitry that interfaces with the sensor suite 278, converts analog sensor signals to digital signals, and provides the digital signals to the room control processor 272. As discussed above, examples of low power, micro-electronic A/D converters and sensor interface circuitry are shown in the WINS Presentation.

The programmable non-volatile memory 274, which may be embodied as a flash programmable EEPROM, stores configuration information for the hub module 274. By way of example, programmable non-volatile memory 274 preferably includes system identification information, which is used to associate the information generated by the sensor module 274 with its physical and/or logical location in the building control system. The memory 274 further includes set-up configuration information related to the type of sensor being used. The memory 274 may further include calibration information regarding the sensor, and system RF communication parameters employed by the control processor 272, the network interface 270 and/or the local RF communication circuit 280.

The MEMS local RF communication circuit 280 may suitably include a Bluetooth RF modem, or some other type of short range (about 30-100 feet) RF communication modem. The MEMS local RF communication circuit 280 is operable to communicate using the same RF communication scheme as the MEMS local RF communication circuits 210, 230 and 250. As with the sensor module 204, the use of a MEMS-based RF communication circuit allows for reduced power consumption, thereby enabling the potential use of a true wireless, battery operated hub module 202. Moreover, it may be possible and preferable to employ many of the same RF elements in both the local RF communication circuit 280 and the network interface 270. Indeed in some cases, the local RF communication circuit 280 and the network interface 270 are substantially the same circuit. In any event, a suitable MEMS-based RF communication circuit is discussed in the WINS Presentation.

The control processor 272 is a processing circuit operable to control the general operation of the hub module 274. In addition, the control processor 272 implements a control transfer function to generate control output values that are provided to the actuator module 208 in the space control subsystem 110. To this end, the control processor 272 obtains sensor information from its own sensor suite 278 and/or from sensor modules 204 and 206. The control processor 272 also receives a set point value, for example, from the supervisory computer 102 via the network interface 270. The control processor 272 then generates the control output value based on the set point value and one or more sensor values. The control processor 272 may suitably implement a proportional-integral-differential (PID) control algorithm to generate the control output values. Suitable control algorithms that generate control output values based on sensor or process values and set point values are known.

Figure 3:
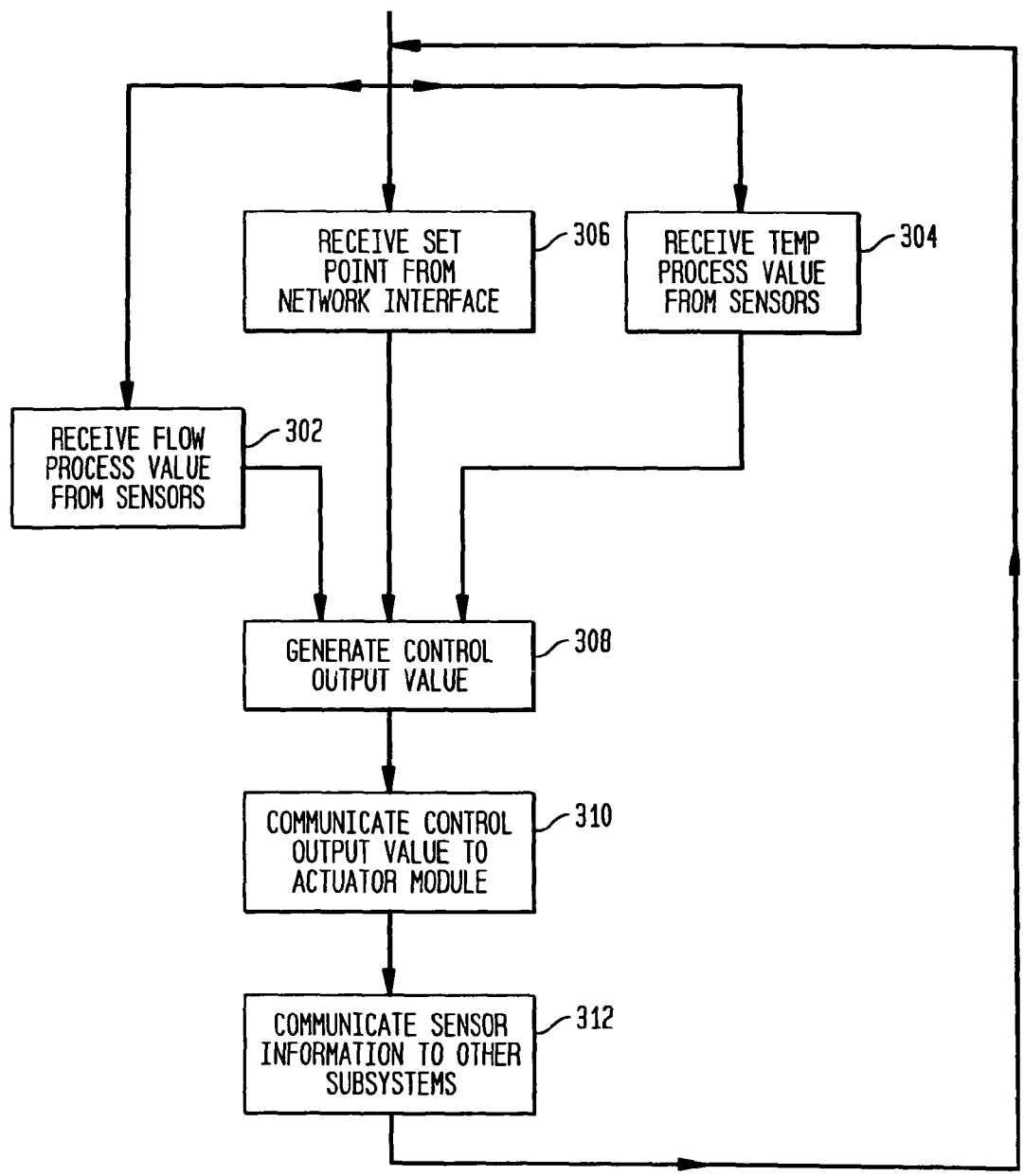
FIG. 3 shows a flow diagram of an exemplary set of operations of a room control processor of the space control subsystem of FIG. 2.

Exemplary sets of operations of the room control system 110 is shown in FIGS. 3, 4 and 5. In general, FIGS. 3, 4 and 5 illustrate how the hub module 202, the sensor module 204 and actuator 208 operate to attempt to control aspects of the environment of the room. More specifically, FIG. 3 shows an exemplary set of operations of the hub module 202, FIG. 4 shows an exemplary set of operations of the sensor module 204, and FIG. 5 shows an exemplary set of operations of the actuator module 208.

Referring particularly to FIG. 3, the operations shown therein will be described with contemporaneous reference to FIG. 2. The operations of FIG. 3 are performed by the room control processor 272, which generally controls the operation of the hub module 202.

Steps 302, 304 and 306 all represent operations in which the room control processor 272 receives input values from various sources. The order in which those steps are performed is not of critical importance.

In step 302, the processor 272 receives a flow value from the sensor module 206, which in the exemplary embodiment described herein has been configured as a flow sensor module. To receive a flow value from the sensor module 206, the processor 272 causes the local RF communication circuit 280 to be configured to receive a transmitted message from the local RF communication circuit 230 of the sensor module 206. When a message is received, the local RF communication circuit 280 and/or the processor 278 verify the source and intended destination of the message. If the message is legitimately intended for the hub module 202, then the processor 278 parses the sensor value from the message for subsequent use.

In step 304, the processor 272 receives temperature measurement values from the sensor module 204 as well as its internal temperature sensor device 278. In many cases, only a single temperature sensor value is necessary, in which case the hub module 202 need not include the temperature sensor 278, or, alternatively, the sensor module 204 would not be necessary. In the exemplary embodiment described herein, however, it will be assumed that the processor 272 receives temperature values from both the temperature sensor device 278 and the sensor module 204. To receive a temperature value from the sensor module 204, the processor 272 and local RF communication circuit 280 operate in the same manner as that described above in connection with receiving flow sensor values from the sensor module 206. To receive a temperature value from the sensor 278, the processor 272 receives digital sensor information from the signal processing circuit 276.

In step 306, the processor 272 obtains a set point value through the network interface 270. In particular, in the embodiment described herein, the set point temperature for the room in which the control subsystem 110 is disposed is provided from a device external to the control subsystem 110. For example, the supervisory computer 102 of FIG. 1 may provide the temperature set points for all of the space control subsystems 110, 112 and 114 in the building control system 100. It will be noted, however, that in alternative embodiments, the set point may be derived from a manually-adjustable mechanism directly connected to the hub module 202.

To receive the set point value from the external device, the network interface 270 monitors transmissions in the WAN on which the various subsystems communicate. If a message including a set point intended for the space control subsystem 110 is received by the network interface 270, then that message will be provided to the processor 272. In such a case, the processor 272 parses out the set point information for subsequent use, such as use in the execution of step 308, discussed below.

In step 308, the processor 272 generates a control output value based on the most recently received set point value and temperature sensor values. To this end, the processor 272 may suitably employ a PID controller algorithm to generate the control output value. In the embodiment described herein, the control output value is representative of a desired change in a vent damper position. For example, if chilled air is provided through the vent, and the sensor temperature value exceeds the set point temperature value, then the control output value identifies that the vent damper must be opened further. Further opening the vent damper allows more chilled air to enter the room, thereby reducing the temperature.

A PID control algorithm that is capable of generating a vent damper position based on a difference between temperature sensor values and a set point temperature value would be known to one of ordinary skill in the art. In general, it will be noted that the use of particular control system elements such as temperature sensors, set point temperatures, and vent dampers are given by way of illustrative example. The use of control systems and subsystems with reduced wiring as generally described herein may be implemented in control systems implementing a variety of sensor devices and actuators or other controlled devices.

Referring again to the specific embodiment described herein, it will be appreciated that during ongoing operation, the processor 272 does not require an update in each of steps 302, 304 and 306 prior to performing step 308. Any update received in any of those steps can justify a recalculation of the control output value. Moreover, the processor 272 may recalculate the control output value on a scheduled basis, without regard as to which input values have changed.

In step 310, the processor 272 causes the generated control output value to be communicated to the actuator module 208. To this end, the processor 272 and the local RF communication circuit 280 cooperate to generate a local RF signal that contains information representative of the control output value. The processor 272 may suitably add a destination address representative of the actuator module 208 to enable the actuator module 208 to identify the message.

It is noted that in the exemplary embodiment described herein, the flow sensor value received from the flow sensor module 206 is not used in the PID control calculation performed by the processor 272. That value is obtained so that it may be used by other subsystems or by the supervisory computer 102. Indeed, multiple sensor values are typically communicated to external subsystems.

To this end, in step 312, the processor 272 causes the network interface 270 to transmit received sensor values to devices external to the room control subsystem 110. For example, the processor 272 may cause temperature and flow sensor values to be transmitted to the supervisory computer 102. The supervisory computer 102 may then use the information to monitor the operation of the building control system. Moreover, temperature and/or flow sensor values from various space control subsystems may be employed by the fan control subsystem 108 to adjust operation of one or more ventilation fans, or by the chiller control subsystem 106 to adjust operation of the chiller plant. Accordingly, the processor 272 must from time to time cause sensor values generated within the space control subsystem 110 to be communicated to external devices through the network interface 270.

The room control processor 272 repeats steps 302-312 on a continuous basis. As discussed above, the steps 302-312 need not be performed in any particular order. New sensor and/or set point values may be received periodically either on a schedule, or in response to requests generated by the processor 272.

With regard to the sensor values, FIG. 4 shows an exemplary set of operations performed by the sensor module 204 in generating and transmitting temperature sensor values to the hub module 202 in accordance with step 302 of FIG. 3. The sensor module 206 may suitably perform a similar set of operations to generate and transmit flow sensor values to the hub module 202 in accordance with step 304 of FIG. 3.

Referring now to FIG. 4, the operations shown therein are performed by the microcontroller 212 of the sensor module 204. In step 402, the microcontroller 212 determines whether it is time to transmit an updated temperature value to the hub module 202. The determination of when to transmit temperature values may be driven by a clock internal to the sensor module 204, or in response to a request or query received from the hub module 202, or both. In either event, if it is not time to transmit an update, the microcontroller 212 repeats step 402.

If, however, it is determined that an update should be transmitted, then the microcontroller 212 proceeds to step 404. In step 404, the microcontroller 212 obtains a digital value representative of a measured temperature from the signal processing circuit 216. To this end, the microcontroller 212 preferably "wakes up" from a power saving mode. The microcontroller 212 preferably also causes bias power to be connected to power consuming circuits in the signal processing circuit 216, such as the A/D converter. In this manner, power may be conserved by only activating power consuming circuits when a temperature sensor value is specifically required. Otherwise, the power consuming devices remain deactivated. Thus, for example, if a temperature value need only be updated every fifteen seconds, many of the power consuming circuits would only be energized once every fifteen seconds. However, it is noted that if the power source 220 is derived from AC building power, the need to reduce power consumption is reduced, and the microcontroller 212 and the signal processing circuit 216 may receive and process digital temperature sensing values on an ongoing basis.

In any event, after step 404, the microcontroller 212 proceeds to step 406. In step 406, the microcontroller 212 converts the sensed digital temperature value into the format expected by the room control processor 272 of the hub module 202. The microcontroller 212 further prepares the message for transmission by the local RF communication circuit 210. Once the message including the sensor temperature value is prepared, the microcontroller 212 in step 408 causes the local RF communication circuit 210 to transmit the message. The message is thereafter received by the hub module 202 (see step 304 of FIG. 3). Thereafter, the microcontroller 212 may return to step 402 to determine the next time an update is required.

FIG. 5 shows an exemplary set of operations that may be performed by the microcontroller 252 of the actuator module 208. As discussed above, one purpose of the space control subsystem 110 is to control the physical operation of a device to help regulate a process variable, in this case, the room temperature. The actuator module 208 thus operates to carry out the actions determined to be necessary in accordance with the control algorithm implemented by the room process controller 272.

First, in step 502, a message which may include the control output value is received from the hub module 202. To this end, the RF communication circuit 250 receives the message and provides the message to the microcontroller 252. Thereafter, in step 504, the microcontroller 252 determines whether the received message is intended for receipt by the actuator module 208. If not, then the microcontroller 252 returns to step 502 to await another incoming message.

If, however, the microcontroller 252 determines in step 504 that the received message is intended for the actuator module 208, then the microcontroller 252 proceeds to step 506. In step 506, the microcontroller 252 parses the message to obtain the actuator control output value, and converts that value into a value that will cause the actuator to perform the requested adjustment. For example, if the received control output value identifies that the ventilator damper should be opened another 10%, then the microcontroller 252 would generate a digital output value that, after being converted to analog in the signal processing circuit 256, will cause the actuator 258 to open the ventilator damper another 10%.

In step 508, the microcontroller 252 actually provides the digital output value to the signal processing circuit 256. The signal processing circuit 256 then converts the value to the corresponding analog voltage expected by the actuator device 258. Thereafter, the microcontroller 252 returns to step 502 to await the next message received from the hub module 202.

The above described space control subsystem 110 is merely an exemplary illustration of the principles of the invention. The principles of the invention may readily be applied to control subsystems having more or less sensors or actuators, as well as other elements, and to control subsystems that control other aspects of the building control system. By way of example, my co-pending application entitled "Building Control System and Fume Hood System for Use Therein Having Reduced Wiring Requirements", Ser. No. 10/353,110, filed on even date herewith, which is owned by the assignee of the present invention and incorporated herein by reference, describes another exemplary space control subsystem that may be used in the system 100.

The relatively low power requirements enabled by the use of MEMS devices and local RF communications in the sensor modules and even the hub module allow for implementation of the modules in battery operated format. Thus, a mostly wireless building control system may be developed. However, as discussed above, many advantages of the present invention may be obtained in systems that use other forms of power.

As discussed above, one of the advantages provided by the sensor module design discussed above (e.g. the sensor module 204) is that it may be configured to perform a variety of different sensor operations.

FIGS. 6 and 7 shows an exemplary MEMS-based module 600 that may be readily be used as a sensor module in a plurality of HVAC, building safety, building automation and other systems. In general, the module 600 is implemented as a single, self-powered, standalone device in which most of the active components are integrated onto one or two semiconductor substrates.

Referring now to FIG. 6, the module 600 in the embodiment described herein includes a top semiconductor layer 602, a lithium ion battery layer 604 and a bottom semiconductor layer 606. The various functions of the module 600, discussed below in connection with FIG. 7, are incorporated into the top and bottom semiconductor layers 602 and 606. The lithium ion battery layer 604 provides a source of electrical power to the top and bottom semiconductor layers 602 and 606. The lithium ion battery layer 604 is preferably disposed between the top and bottom semiconductor layers 602 and 606 to provide an advantageous, space-efficient layout. Various interconnects may be provided between the two semiconductor layers 602 and 606 around the lithium ion battery layer 604 as need. In the alternative, one of the two layers may be dedicated completely to a light-powered recharging circuit for the lithium ion battery layer 604.

FIG. 7 shows a block diagram representation of the module circuits 700 that are implemented into the semiconductor layers 602 and 606 of the module 600. The module circuit 700 include a sensor suite 702, an EEPROM 704, a processing circuit 706, a power management circuit 708 and an RF communication circuit 710.

The RF communication circuit 710 is a MEMs based communication circuit such as that described above in connection with FIG. 2. The RF communication circuit 710 is preferably configured to communicate using at least one local RF communication format, such as Bluetooth.

The power management circuit 708 that preferably operates to recharge the lithium ion battery layer 604 of FIG. 6, and may include semiconductor devices that convert light or RF energy into electrical energy that may be used to trickle charge the lithium ion battery.

The sensor suite 702 is collection of MEMs sensors incorporated into a single substrate. The incorporation of multiple MEMs sensor technologies is known. For example, Hydrometrics offers for sale a MEMs sensor device that includes both temperature and humidity sensing functions. MEMs based light, gas content, temperature, flow, smoke and other sensing devices are known. Such devices are in the embodiment described herein implemented onto a single substrate 602 or 606, or pair of substrates 602 and 606.

The processing circuit 706 preferably incorporates a microprocessor or microcontroller, as well as microelectronics A/D circuits for connecting to the MEMs sensor devices of the sensor suite 702. In the embodiment described herein the signal processing circuit 706 otherwise controls the operations of the module 600 in the manner described above in connection with the signal processing circuit 216 and controller 212 of the sensor module 204 of FIG. 2.

The EEPROM 704 (which may be another type of non-volatile, chip-based memory such as ferro-electric or ferro-magnetic RAM) is a non-volatile memory that stores the configuration information for the module 600. For example, the EEPROM 704 may store ID information used to identify the module 600 to the system in which it is connected. The EEPROM 704 also stores information related to the function in which the module 600 will be used. For example, the EEPROM 704 may store information identifying that the module 600 should enable its temperature sensing function as opposed to any of its other possible sensing functions.

As discussed above in connection with FIG. 2, the configuration information in the EEPROM 704 may simply identify the intended functionality of the module 600, which would then cause the processing circuit 706 to execute portions of program code stored in ROM (not shown) to carry out that functionality. To this end, the EEPROM 704 may be replaced by a set of DIP switches that may be manually manipulated to set the configuration of the module 600. In either case, such embodiments would require that most of the program code for a variety of different sensor functions be stored in ROM, only a portion of which would be used once the configuration information is received.

However, in one embodiment of the invention, most or all of the code unique to the selected function of the module is downloaded into the EEPROM 704 during configuration of the device. Thus, if the module 600 is to operate as a temperature sensor module, then all appropriate code for a temperature sensor module is downloaded to the EEPROM 704, as is identification information and calibration information.

Regardless of whether the EEPROM 704 is configured via large amounts of programming code, or through flags and parameters that are used to select pre-existing code within the module 700, the configuration information is downloaded to the EEPROM from an external device, for example, a portable programming device. In particular, a portable programming device provides programming instructions via RF signals to the RF communication circuit 710. The processing circuit 706 obtains the programming instructions from the RF communication circuit 710 and stores the instructions into the EEPROM 704. It will be appreciated that other techniques for providing configuration information to the EEPROM 704 may be used.

Thus, the above described module 600 may readily be configured as any one of a large plurality of sensor types or even other types of building automation system components. As a consequence, large amounts of the devices may be fabricated, thereby reducing the per-unit tooling and design costs associated with ordinary building automation sensors. In addition, the highly integrated nature of the devices reduces shipping and storage costs, as well as reduces power consumption. It will be noted that the design of the module 600 may not only be used as the sensor modules 204, 206 in the exemplary space control subsystem 200 of FIG. 2, but may also be used as the hub module 202. The network interface 270 of the hub module 202 may be configured to operate via the RF communication circuit 710 of the module 600 of FIGS. 6 and 7.

It will be appreciated that the module 600 may be made universal for use as both a sensor module or an actuator module. To this end, the module 600 would not include an actuator (e.g. the actuator 262 of FIG. 2), but rather outputs to an external actuation device which in the exemplary embodiment described herein may be any commercially available building control system actuator. To this end, the processing circuit 706 is configured to generate digital or analog outputs to a wide range of actuator devices. To accommodate the different actuator designs, device driver information for the actuator device is programmed into the processor of the processing circuit 706 (and/or may be partly or fully stored in the EEPROM 704). Moreover, the processing circuit 706 itself includes digital to analog conversion circuitry. Thus, preferably, the processing circuit 706 preferably includes digital to analog and analog to digital conversion circuitry to allow both sensor input and actuator output. It is also noted that the processing circuit 706 may also include inherent memory that incorporates routines for self-commissioning, self-configuring and fault diagnostics for the module 600.

In another aspect of the invention, a space control subsystem exemplified by the space control subsystem 110 of FIG. 2 may readily be modified for use in a conventional wired building control system. Such a space control subsystem would still provide the advantage of a mostly wireless room subsystem, which will greatly reduce the labor involved in installation of the space control subsystem. Indeed, one aspect of the present invention is a method of retrofitting an existing building automation or HVAC system with wireless subsystem modules such as the modules 600 of FIGS. 6 and 7 or the modules 204, 206 of FIG. 2.

Figure 9:
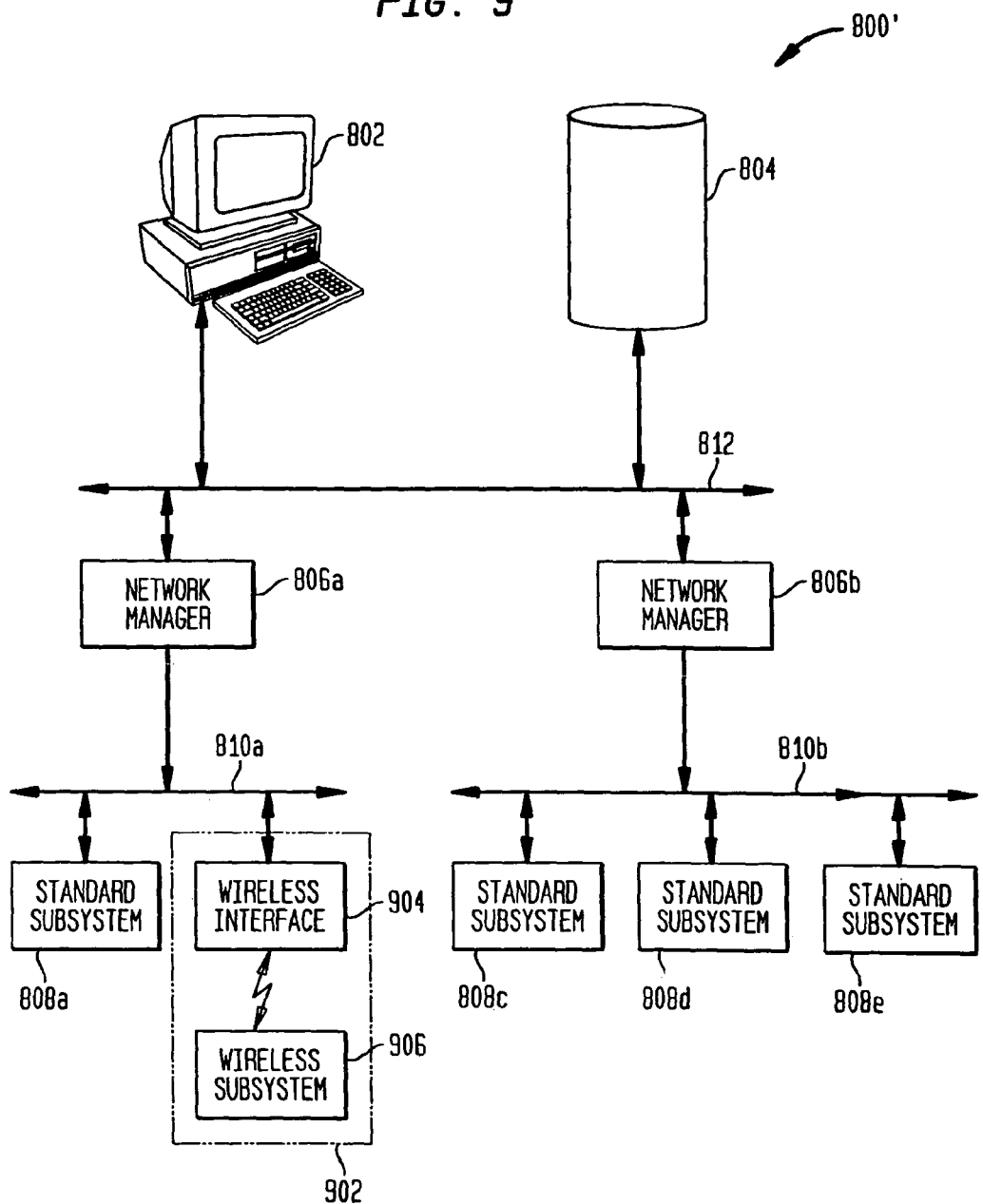
FIG. 9 shows a block diagram of the building system of FIG. 8 with a retrofitted subsystem in accordance with the invention.

To illustrate this concept, FIGS. 8, 9 and 10 illustrate progressive steps in a partial retrofit of an ordinary prior art wired building automation system. FIG. 8 shows a prior art building automation system 800 before it is to retrofitted with wireless modules. FIG. 9 shows the building automation system 800' with an isolated subsystem replaced by a wireless retrofit subsystem 902. FIG. 10 shows the building automation system 800" with multiple subsystems replaced by the various wireless modules and subsystems.

Referring to FIG. 8, the prior art building automation system includes at least one supervisory control system 802, a system database 804, plural network managers 806a and 806b, and plural subsystems 808a-808e.

Each of the subsystems 808a-808e represents one of plurality of localized, standard building automation subsystems, such as space temperature control subsystems, a lighting control subsystems, or the like. Each subsystem typically includes a controller, such as, for example, the model Predator controller available from Siemens Building Technologies of Buffalo Grove, Ill. Larger, more complex subsystems such as chiller plant control subsystems may employ a model Raptor controller, also available from Siemens Building Technologies. Groups of subsystems such as subsystems 808a and 808b are typically organized into networks and generally operate in a master/slave relationship with a network manager such as the network manager 806a. The network manager may suitably be a TALON Network Manager, also available from Siemens Building Technologies.

To facilitate communication between the various subsystems of the local networks, the subsystems 808a and 808b and the network manager 806a are all connected to a local, low-level data network 810a, sometimes referred to as a floor network. The data network may suitably employ the standardized LonTalk protocol. Subsystems 808c, 808d and 808e along with the network manager 806b are similarly connected via another low-level data network 810b.

The network managers 806a and 806b are also connected via an enterprise network 812 to the supervisory computer 802 and the database 804. The network managers 806a and 806b thereby coordinate the communication of data and control signals between the subsystems 808a-808e and the supervisory computer 802 and database 804. The supervisory computer 802, similar to the supervisory computer 102 of FIG. 1, provides overall control of the building automation system 800 and includes a user interface. The database 804 stores historical data, error data, and other logged events. The enterprise network 812 may connect to other supervisory computers, Internet gateways, or other gateways to other external devices, as well as additional network managers (which in turn connect to more subsystems via additional low level data networks). The enterprise network 812 may suitably comprise an Ethernet or similar wired network and may employ TCP/IP, BACnet, XML and/or other protocols that support high speed data communications.

In addition to the large amount of wiring necessitated by the networks 810a, 810b and 812, each subsystem 808a-808e itself requires significant amounts of wiring. Accordingly, replacing the system 800 with a wireless system similar to the wireless system 100 of FIG. 1 would greatly reduce the wiring of the building automation system. However, it is not always economically or logistically possible to replace an entire building automation system at one time.

Accordingly, in accordance with one aspect of the invention, the portions of the building automation system 800 may be progressively retrofitted with wireless systems based on the wireless modules described above in connection with FIGS. 2, 6 and 7.

A first step in retrofitting the network 800 consists of replacing individual subsystems with wireless subsystems. The wireless subsystems have the general configuration as those described above in connection with FIGS. 1 and 2. FIG. 9 shows the network 800' with one standard subsystem 808b (see FIG. 8) replaced by a retrofit subsystem 902 that includes a wireless interface 904 and a wireless subsystem 906. The wireless interface 904 is a device that operates as an interface between the low-level wired data network 810a and the wireless RF protocol employed by the wireless subsystem 906. The wireless subsystem 906 may suitably have the structure of any of the space control subsystems 106, 108, 110, 112, and 114 of FIG. 1. Moreover, by employing the wireless interface 904 to translate between the wired data network 810 and the wireless control subsystems, the wireless control subsystems may be made up of standard modules such as the wireless module 600 of FIGS. 6 and 7. As a consequence, the wireless module 600 could be equally useful without physical alteration in either a total wireless building automation system such as the system 100 of FIG. 1, or as part of a retrofit of a wired building system such as the building automation system 800 of FIG. 8.

In addition, as shown in FIG. 9, the retrofit subsystem 902 is transparent to the building automation system 800', and thus may be implemented without disrupting the existing system.

FIG. 10 shows an advanced state of retrofit in which an entire set of subsystems 808a and 808b (and the corresponding network manager 806a) are replaced by a retrofit subnetwork 1002. The retrofit subnetwork 1002 includes a wireless interface 1004, a first wireless subsystem 1006a and a second wireless subsystem 1006b.

The wireless interface 1004 operates as an interface between the wired enterprise network 812 and the wireless subsystems 1006a and 1006b. Each of the wireless subsystems 1006a and 1006b may suitably comprise a wireless subsystem such as any of the subsystems 106, 108, 110, 112 or 114 of FIG. 1. The wireless subsystems 1006a and 1006b, however, also communicate between themselves using a wireless protocol, such as the packet hopping scheme described above in connection with FIG. 1. Accordingly, the need for the network manager 806a may be eliminated. The data interface/management functionality previously provided by the network manager 806a may readily be programmed into a wireless module (see e.g. module 600 of FIGS. 6 and 7) of one of the subsystems 1006a or 1006b.

One or more other groups of subsystems may similarly be replaced until the entire building automation system 800" begins to resemble the system 100 of FIG. 1. Thus, FIGS. 9 and 10 illustrate how an existing, prior art wired building automation system may be progressively retrofitted with wireless components and subsystems, using wireless modules and subsystems described herein.

It will be appreciated that the above described embodiments are merely illustrative, and that those of ordinary skill in the art may readily devise their own adaptations and implementations that incorporate the principles of the present invention and fall within the spirit and scope thereof. For example, while it is noted above that the hub module may further including sensing capability, it should further be appreciated that the hub module may instead include actuator module capabilities. Moreover, the PID control algorithm performed by the control processor 272 may instead be carried out by any of the microcontrollers 212, 232 or 252.

Another notable drawback of prior art building automation systems is their inability to understand the environment and the dynamics associated with it. The environment it controls or manages largely uses a limited number of temperature sensors, especially for comfort. The prior art systems employ simple strategies to maintain indoor air quality again using a few sensors. The building components that actually constitute environment such as occupants, envelopes, equipment etc. are totally disconnected from the building automation system, and do not share any responsibility nor do they provide any feedback to the building automation system for the overall environment management. The building automation system is usually imposed upon the physical system and it attempts to maintain a controlled environment using a few sensors and distributed controllers. By defining a true environment and allowing all the components within it to share and to cooperate with a common goal of maintaining a healthy, safe and productive environment will be a major breakthrough for building automation systems and for that matter for the entire building industry. Technologies are emerging fast that can create such environment cost-efficiently.

A holistic view of an advanced building system environment is described briefly below. The scope of advanced building systems includes everything within the building as opposed to the control environment of current building system as described before. The core of the advanced building system is based on the fact that it is not a system that is imposed on the building environment but instead includes environment components and even occupants as active participants within that building system. The advanced building system includes building components like walls and fenestration that now use substrate-based compounds capable of changing their characteristics in response to outdoor environment. For example, when the building system senses that the outdoors temperature or solar gain is high, it increases electrical signal through the wall and fenestration causing the substrate property to change and block much of the heat gain. Thus, the building system is allowed to control the injection of the heat input to the space right at its entry point. The reverse phenomenon occurs when the building system allows more heat actually to penetrate the building envelope for heating application.

The advanced building system also employs a series of local heating and cooling using micro heat exchangers that are designed to offset local gain or loss of heat. The resultant affect is that the space does not require any cooling or heating from a traditional source of large plant except for its ventilation need. Even there the plant can use micro-combined cooling, heating and power plant using fuel cell, micro-turbines or similar technologies. By being able to control the heat disturbances at the points of entry to the space and using microtechnology, the overall building cooling and heating plants will be smaller, environmentally benign and smarter.

The above described building system will utilize a large number of modules such as the module 600 of FIGS. 6 and 7 distributed throughout the space providing smart sensing and control in order to achieve a variety of goals including comfort, building protection, security, Indoor Air Quality (IAQ) and performance optimization. The standard wireless protocol employed by the module 600 provides significant advantage in installation and operation.

I claim:

1. A building control system comprising:
   a plurality of controller arrangements, each controller arrangement including
   a controller operable to generate a control output value based on at least one process value and at least one set point value,
   at least one sensor module operable to generate the at least one process value, the at least one sensor module operably connected to the controller,
   a first wireless communication interface operably coupled to the controller, the first wireless communication interface configured to communicate information with a remote element of the building control system using a first wireless communication scheme;
   wherein the at least one sensor module includes a wireless communication interface operable to communicate information with the controller using a second wireless communication scheme, wherein the second wireless communication scheme is a different type of communication scheme than the first wireless communication scheme; and
   wherein the first wireless communication interface is configured to communicate information with the remote element of the building control system via a building level network using the first wireless communication scheme and wherein the at least one sensor module wireless communication interface is operable to communicate information with the controller via a room network using the second wireless communication scheme.

2. The building control system of claim 1 wherein the remote element comprises a central controller operable to communicate information with the controllers of each of the plurality of controller arrangements.

3. The building control system of claim 1 wherein the remote element comprises a controller of at least one other controller arrangement.

4. The building control system of claim 1 wherein the at least one sensor module includes a microelectromechanical sensor device.

5. The building control system of claim 1 wherein at least some of the plurality of controller arrangements include an actuator module, the actuator module operably connected to the controller to receive the control output value therefrom, the actuator module operable to cause actuation of an actuation element responsive to the control output value.

6. The building control system of claim 5 wherein each of the actuator modules includes a wireless communication interface, and wherein the controller is configured to communicate the control output value to the actuator module using the second wireless communication scheme.

7. The building control system of claim 1 wherein the first wireless communication scheme comprises a wireless area network communication scheme.

8. A building control system comprising:
a plurality of controller arrangements configured to communicate information with a remote element of the building control system via a building level network using a first wireless communication scheme, each controller arrangement including
a controller operable to generate a control output value based on at least one process value and at least one set point value,
at least one sensor module operable to generate the at least one process value, the at least one sensor module operably connected to the controller,
a first wireless communication interface operably coupled to the controller, the first wireless communication interface configured to communicate information with the remote element of the building control system using the first wireless communication scheme;
an actuator module, the actuator module operably connected to the controller to receive the control output value therefrom, the actuator module operable to cause actuation of an actuation element responsive to the control output value, and wherein
the controller is configured to communicate the control output value to the actuator module via a room network using a second wireless communication scheme, wherein the second wireless communication scheme is a different type of communication scheme than the first wireless communication scheme.

9. The building control system of claim 8 wherein the remote element comprises a central controller operable to communicate information with the controllers of each of the plurality of controller arrangements.

10. The building control system of claim 8 wherein the remote element comprises a controller of at least one other controller arrangement.

11. The building control system of claim 8 wherein the at least one sensor module includes a microelectromechanical sensor device.

12. The building control system of claim 8 wherein the first wireless communication scheme comprises a wireless area network communication scheme.

13. The building control system of claim 12 wherein the at least one sensor module includes a wireless communication interface operable to communicate information with the controller using the second wireless communication scheme.

* * * * *